(12) United States Patent
Wright (10) Patent No.: US 11,739,874 B2
(45) Date of Patent: Aug. 29, 2023

(54) BLACK TANK SEWER FLUSH ADAPTER

(71) Applicant: Jeffery Wright, Clements, CA (US)

(72) Inventor: Jeffery Wright, Clements, CA (US)

( * ) Notice: Subject to any disclaimer, the term of this patent is extended or adjusted under 35 U.S.C. 154(b) by 134 days.

(21) Appl. No.: 17/146,470

(22) Filed: Jan. 11, 2021

(65) Prior Publication Data

US 2022/0221096 A1 Jul. 14, 2022

(51) Int. Cl.
*F16L 39/02* (2006.01)
*F16L 45/00* (2006.01)
*F16L 41/02* (2006.01)
*B60R 15/00* (2006.01)

(52) U.S. Cl.
CPC .............. *F16L 39/02* (2013.01); *B60R 15/00* (2013.01); *F16L 41/023* (2013.01); *F16L 45/00* (2013.01)

(58) Field of Classification Search
CPC ......... F16L 39/02; F16L 45/00; F16L 41/023; F16L 55/124; F16L 37/248; F16L 2201/10; F16L 43/00; B06R 15/00; E03F 1/008; E03C 1/306
USPC ............. 285/124.1, 179.1, 182, 126.1, 248.1
See application file for complete search history.

(56) References Cited

U.S. PATENT DOCUMENTS

| | | | |
|---|---|---|---|
| 1,200,118 A | 10/1916 | Keeler | |
| 2,286,566 A * | 6/1942 | Norton | |
| 3,095,001 A * | 6/1963 | Steltz | |
| 3,224,800 A | 12/1965 | Fisher | |
| 3,355,201 A | 11/1967 | Barwick | |
| 3,659,880 A | 5/1972 | Goldsobel | |
| 4,367,769 A * | 1/1983 | Bain | |
| 4,722,556 A | 2/1988 | Todd | |
| 4,736,968 A * | 4/1988 | Glegg | F16L 45/00 |
| 4,758,027 A | 7/1988 | Todd | |
| 4,796,926 A | 1/1989 | Rapsilver | |
| 4,805,444 A | 2/1989 | Webb | |
| 5,151,017 A * | 9/1992 | Sears | |
| 5,915,411 A | 6/1999 | Gilbert | |
| 5,971,438 A | 10/1999 | Johnson | |

(Continued)

OTHER PUBLICATIONS

Pipe Sizes Info, [online]. Plumbing Supply. Retrieved from the Internet: <URL: https://web.archive.org/web/20180818044226/https://www.plumbingsupply.com/info-pipesizes.html> (Year: 2018).*

(Continued)

*Primary Examiner* — Zachary T Dragicevich
*Assistant Examiner* — William S. Choi
(74) *Attorney, Agent, or Firm* — Hickman Becker Bingham Ledesma LLP (57) ABSTRACT

A black tank sewer flush adapter comprises a tubular body, a boss connector connected to or integrally formed to the tubular body, a flexible sealing washer, and a fastener. The fastener is for forming an attachment with the distal end of the boss connector while the water hose passes longitudinally through at least all the opening of the fastener, the opening of the flexible sealing washer, and the distal end opening of the boss connector. By allowing the water stream emitting end of the water hose to pass through the boss connector and the proximal end of the adapter and into a black tank, the water stream can be applied directly to the interior surfaces of the black tank and a net increase in dislodging adhered sludge from the interior surfaces of the black tank is observed.

15 Claims, 6 Drawing Sheets

(56) References Cited

U.S. PATENT DOCUMENTS

| | | | |
|---|---|---|---|
| 6,123,367 | A | 9/2000 | Miller |
| 6,609,847 | B1 | 8/2003 | Wang |
| 6,619,697 | B2* | 9/2003 | Griffioen |
| 7,036,524 | B2 | 5/2006 | Kennedy |
| 7,156,574 | B1 | 1/2007 | Garst |
| 7,174,921 | B1 | 2/2007 | Wiltse |
| D564,076 | S | 3/2008 | Brockington |
| 8,465,059 | B1 | 6/2013 | Price |
| 8,479,776 | B2 | 7/2013 | Berardi |
| 8,777,274 | B2 | 7/2014 | Chou |
| 2004/0112448 | A1 | 6/2004 | Faahs |
| 2007/0052235 | A1 | 3/2007 | Buff |
| 2007/0235096 | A1 | 10/2007 | Nielsen |
| 2008/0224468 | A1 | 9/2008 | Dohm |
| 2009/0236001 | A1 | 9/2009 | Damaske |
| 2010/0018590 | A1 | 1/2010 | Damaske |
| 2011/0148093 | A1 | 6/2011 | Choi |
| 2013/0056976 | A1 | 3/2013 | Kim |
| 2013/0249206 | A1 | 9/2013 | Chou |
| 2013/0319564 | A1* | 12/2013 | Torres |
| 2014/0076414 | A1* | 3/2014 | Kokoski |
| 2014/0318671 | A1 | 10/2014 | Swarts |
| 2016/0061359 | A1 | 3/2016 | Grech |
| 2016/0195208 | A1* | 7/2016 | Cassiday |
| 2017/0175934 | A1 | 6/2017 | Bledsoe |

OTHER PUBLICATIONS

Wright, U.S. Appl. No. 29/648,232, filed May 18, 2018, Office Action, dated Nov. 6, 2019.
Wright, U.S. Appl. No. 29/648,232, filed May 18, 2018, Notice of Allowance, dated Jun. 17, 2020.
Wright, U.S. Appl. No. 29/648,232, filed May 18, 2018, Final Office Action, dated Apr. 6, 2020.
Wright, U.S. Appl. No. 15/984,041, filed May 18, 2018, Office Action, dated May 28, 2020.
Wright, U.S. Appl. No. 15/984,041, filed May 18, 2018, Notice of Allowance, dated Nov. 5, 2020.

* cited by examiner

BLACK TANK SEWER FLUSH ADAPTER

CROSS-REFERENCE TO RELATED APPLICATION

This application is related to U.S. patent application Ser. No. 15/984,041, entitled "Extender for Vehicle Sewer Connection," filed May 18, 2018 and issued Dec. 15, 2020 as U.S. Pat. No. 10,865,556.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2021 Jeffery Wright.

FIELD OF THE INVENTION

The present disclosure is in the technical fields of pipe or conduit fittings, adapters or couplings, especially those for use with sanitary sewer connections. Another technical field is sewer hookup accessories for recreational vehicles, motorhomes, fifth wheels, trailers, and other like vehicles.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many recreational vehicles, motorhomes, fifth wheels, trailers, and other like vehicles are equipped with lavatories or water closets and "black" tanks that store sewage until the waste can be drained to an external sewer line, tank, or blackwater recovery facility. The black tank is typically connected to piping that terminates at a waste valve near the exterior of the vehicle, often on the underside or chassis of the vehicle.

To drain waste from the black tank, it is typically necessary to connect the waste valve of the vehicle to an external sewer drain. The typical approach is to connect one end of a flexible sewer hose to the vehicle's waste valve and the other end of the sewer hose to the sewer drain.

Despite regular discharge of waste from the black tank, sewage can accumulate on the interior walls of the tank over time. Cleaning the interior of the black tank conventionally involves partially filing the black tank with water from multiple flushes of an attached toilet bowel where one or more of the flushes includes a chemical treatment added to the bowl water before flushing. The treated water is then allowed to stand in the black tank for some time to react with the sewage before it is drained from the black tank via the waste valve.

Some vehicles are equipped with a black tank flush system that includes an exterior-facing water inlet valve that allows for connection to a water source via a water hose connection.

There are also black tank sewer flush adapters that can attach to the vehicle's waste valve and a sewer hose. The adapters have a fitting protruding from a portion of the adapter to which a water hose can be attached to fill the black tank with water. The standing water and sewage can then be drained from the black tank to a sewer drain via the attached adapter and sewer hose.

Efforts are continually being made to increase the efficiency of cleaning the black tank interior.

SUMMARY OF THE INVENTION

In a first aspect, the present invention provides a vehicle black tank sewer flush adapter comprising a tubular body having a proximal end opening and a distal end opening. A boss connector is connected to or integrally formed to the tubular body. The boss connector comprises a distal end opening through which a water hose can pass longitudinally and extend from both the distal end opening of the boss connector and the proximal end opening of the tubular body and into the black tank. The flush adapter further comprises a flexible sealing washer and a fastener each comprising an opening through which the water hose can pass longitudinally. The fastener is for forming an attachment with the distal end of the boss connector while the water hose passes longitudinally through at least all the opening of the fastener, the opening of the flexible sealing washer, and the distal end opening of the boss connector.

In a conventional vehicle black water sewer flush adapter, an end of the water hose is attached to the distal end of a fitting protruding from the conventional adapter. As a result, the end of the water hose from which the stream of water is emitted cannot be extended into the interior of the black tank, resulting in decreased pressure washing efficiency. By allowing the water stream emitting end of the water hose to pass through the boss connector and the proximal end of the flush adapter and into the black tank, the water stream can be applied directly to the interior surfaces of the black tank and a net increase in dislodging adhered sewage from the interior surfaces of the black tank is observed.

The fastener may comprise internal threads for forming a secure threaded attachment with the distal end of the boss connector that is externally threaded. The threaded attachment may be conveniently formed while the water hose passes longitudinally through all the opening of the fastener, the opening of the flexible sealing washer, and the distal end opening of the boss connector to secure the flexible sealing washer at the distal end opening of the boss connector in a leak resistant manner.

The flexible sealing washer may be flexible enough to allow the water hose to traverse the washer opening longitudinally when a pull or push force is applied to the water hose such as by a human using a hand gripping the water hose near the boss connector. This allows the nozzle of the water hose to be moved to different positions inside the black tank and thereby increasing the area inside the black tank to which a pressurized water stream is applied. At the same time, the flexible sealing washer may form a leak resistant seal around where the water hose traverses the washer opening to reduce or eliminate leakage out through the washer and fastener and increase or maximize the sewage from the black tank that drains out through the distal end of the flusher adapter.

The tubular body of the flusher adapter can be straight or have an elbow angle to accommodate various vehicle waste valve angles and positions on the vehicle and different sewer drain angles and locations.

The opening of the fastener, the opening of the flexible sealing washer, and the opening of the distal end of the boss connector may each have a respective diameter sufficient to accommodate water hoses of one or more different diameters such as, for example, one-quarter of an inch, three-eighths of an inch, one-half of an inch, five-eighths of an inch, or three-quarters of an inch. The diameter of the flexible sealing washer may be smaller than both the diameter of the fastener and the diameter of the distal end of the boss connector to form a leak resistant seal around the water hose while still allowing the water hose to longitudinally traverse the flexible sealing washer opening when a push or pull force is applied to the water hose.

The tubular body of the flush adapter may include a transparent portion made of clear acrylic or other suitable transparent material that allows for visual observations of sewage draining from the black tank through the tubular body. This allows the operator to observe when the black tank is sufficiently flushed of sewage.

As well as being externally threaded, the distal end of the boss connector may be internally threaded to allow formation of a threaded attachment with a water hose connector. In this configuration, a garden hose or other type of water hose can be attached to the water hose connector to flush components of residual sewage such as the flush adapter itself and other sewage drainage components situated downstream of the flush adapter such as the sewer hose or the "Sewer Extender" described in U.S. Pat. No. 10,865,556 entitled "Extender for Vehicle Sewer Connection," filed May 18, 2018 and issued Dec. 15, 2020, the entire contents of which is hereby incorporated by reference.

The proximal end of the flush adapter can be glued or otherwise connected to an adapter with sewer hose adapter fittings for connecting to a bayonet flange with lug fittings of the vehicle's waste valve. The distal end of the flush adapter can be glued or otherwise connected to a bayonet flange adapter with lug fittings. The bayonet flange adapter can then connect to a sewer hose or the Sewer Extender with sewer hose adapter fittings. Alternatively, the distal end of the flush adapter can be connected to the telescoping body of the Sewer Extender and replacing the hose elbow coupling of the Sewer Extender.

In a second aspect, the present invention provides a black tank sewer flush kit comprising the vehicle black tank sewer flush adapter as described in any of the preceding paragraphs.

BRIEF DESCRIPTION OF THE DRAWINGS

In order that the present invention may be more readily understood, embodiments of the invention will now be described, by way of example, with reference to the accompanying drawings, in which like reference numerals refer to like elements throughout the figures, and in which.

DETAILED DESCRIPTION OF THE INVENTION

Figure 1:
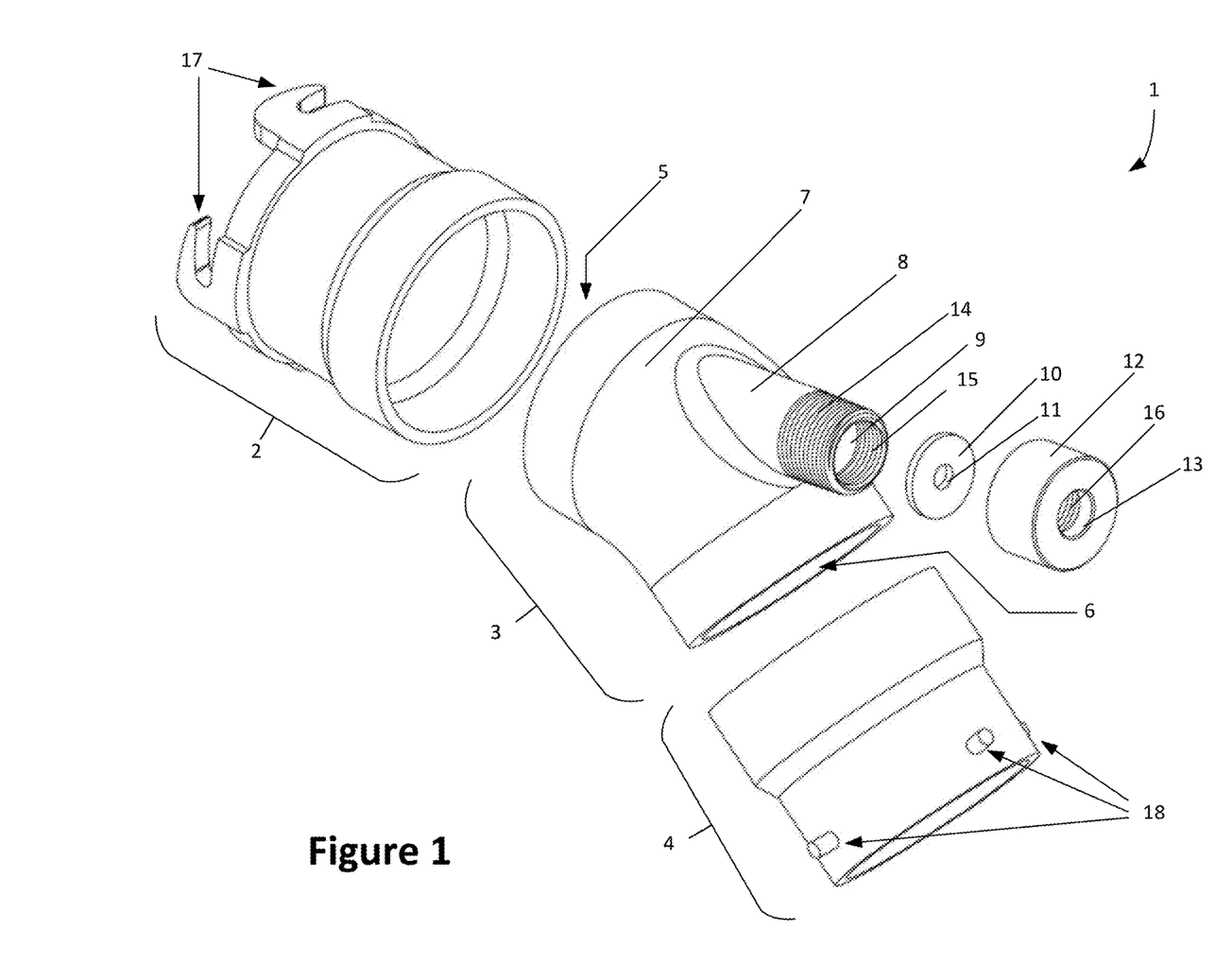
FIG. 1 is an exploded front perspective view of a black tank sewer flush kit in accordance with the present invention.

The vehicle black tank sewer flush kit 1 of FIG. 1 comprises a proximal adapter 2, a flush adapter 3, and a distal adapter 4. Here, proximal adapter 2 is "proximal" and distal adapter 4 is "distal" in the sense that proximal adapter 2 is physically closer to the vehicle's waste valve than distal adapter 4 when kit 1 is assembled and installed for use. Adapters 2, 3, and 4 may be formed of ABS polymer, PVC polymer, or other suitable plumbing material (e.g., aluminum).

In FIG. 1, adapters 2, 3, and 4 of kit 1 are shown in an exploded view for the purposes of providing a clear example. However, in a practical implementation, adapters 2, 3, and 4 may be glued together or otherwise connected as a single unit. While glue has been mentioned, alternatively screws or threaded attachments may be substituted for adhesive. In any case, the distal end of proximal adapter 2 may be connected to the proximal end of flush adapter 3 and the distal end of flush adapter 3 may be connected to the proximal end of distal adapter 4 in a watertight manner that prevents sewage from leaking between the connection points of the adapters 2, 3, and 4 as the sewage drains through the hollow interiors of adapters 2, 3, and 4.

Each of adapters 2, 3, and 4 are generally hollow tubes, cylinders, or pipe segments having open interior cavities through which water and sewage may pass when kit 1 is assembled and installed for use. For example, ABS, PVC, or aluminum pipe having a nominal three-inch diameter and compatible couplers (e.g., bell end) may be used.

In FIG. 1, flush adapter 3 is an elbow adapter with a 45-degree angle. However, flush adapter 3 could instead be a straight adapter or an elbow adapter having an angle other than 45 degrees (e.g., 90 degrees). Generally, the angle may be selected based on the conditions in which flusher adapter 3 will be used. For example, the angle of flush adapter 3 can be between zero and ninety degrees. The conditions that may affect angle choice may include the angle and location of the vehicle's waste valve, the angle and location of the sewer drain connection relative to the angle and location of the vehicle's waste valve, and whether the Sewer Extender is used. In one scenario where the Sewer Extender is used, flush adapter 3 is a straight coupling and the Sewer Extender encompasses an elbow coupling having an angle between zero and ninety degrees.

Proximal adapter 2 includes standard sewer hose adapter fittings 17 for connecting to a bayonet flange with standard lug fitting of the vehicle's waste valve. Distal adapter 4 encompasses a bayonet flange with standard lug fittings 18 for connecting to a sewer hose with standard sewer hose adapter fittings or, alternatively, for connecting to the Sewer Extender with standard sewer hose adapter fittings. In some embodiments, sewer hose adapter fittings 17 can be manually rotated three-hundred and sixty (360) degrees around a longitudinal axis of proximal adapter 2 for convenience in connecting kit 1 to the bayonet flange of the vehicle's waste value and for convenience in positioning kit 1 when assembled and installed for use.

In some embodiments, kit 1 includes only proximal adapter 2 and flush adapter 3 and does not include distal adapter 4. In these embodiments, the distal end of flush adapter 3 may be connected to the telescoping body of the Sewer Extender. Such connection may be made by adhesive, by screws, by threaded attachment, or by other suitable watertight attachment mechanism.

Proximal adapter 2 and distal adapter 4 shown in FIG. 1 are merely examples of possible proximal and distal adapters of kit 1. Other proximal and distal adapters with different fittings and of different dimensions may be used according to the requirements of the particular implementation at hand including the requirements dictated by the vehicle's waste valve connection, the sewer hose connection, or a connection with the Sewer Extender.

Flush adapter 3 has a tubular body 7 with a proximal end opening 5 and a distal end opening 6. A boss connector 8 may be connected to or integrally formed to the tubular body 7. For example, tubular body 7 with boss connector 8 may be manufactured as a single piece using an injection molding or three-dimensional printing process. However, boss connector 8 may also be a separate piece that is connected to the tubular body 7 via a watertight connection. For example, the watertight connection may be a watertight threaded connection whereby the proximal end of the boss connector 8 is threadedly attached to the tubular body 7 at a threaded connection point on the tubular body 7. Where a watertight connection is used to connect boss connector 8 to tubular body 7, the water connection may accommodate connecting tubular body 7 to different boss connectors with different diameters to accommodate different water hoses of different nominal diameters.

Boss connector 8 has a distal end opening 9. Distal end opening 9 is "distal" in the sense that it is farther away from the tubular body 7 than the proximal end opening (not shown) of boss connector 8 that opens into the hollow interior of the tubular body 7. Boss connector 8 is a generally hollow tube, cylinder, or pipe segment having an open interior cavity through which a water hose may pass when inserted, for example, into distal end opening 9 of boss connector 8 and out through the proximal end opening of boss connector 8 and proximal end opening 5 of tubular body 7. Boss connector 8 may be formed of the same or a different material as tubular body 7. For example, boss connector 8 may be formed of ABS, PVC, aluminum, or other suitable plumbing material.

The diameter of distal end opening 9 of boss connector 8 as well as the interior diameter of the boss connector 8 should be of sufficient size to allow a standard water hose to pass through the opening 9 and connector 8 when the standard water hose is not attached to a nozzle. If the water hose nozzle is too large to fit through opening 9 and connector 8, the nozzle may be attached to the water hose after the water hose is passed through opening 9 and connector 8.

In an implementation, the diameter of distal end opening 9 of boss connector 8 is one-half inch or otherwise sufficient to accommodate up to a nominal one-quarter of an inch diameter pressure washing hose for use with a consumer grade electric or gas-powered pressure washer. However, the diameter may be larger to accommodate larger nominal diameter water hoses. The diameter of distal end open 9 may be selected to easily accommodate one or more of the following nominal water hose diameters: three-eighths of an inch, one-half of an inch, five-eighths of an inch, or three-quarters of an inch.

Figure 2:
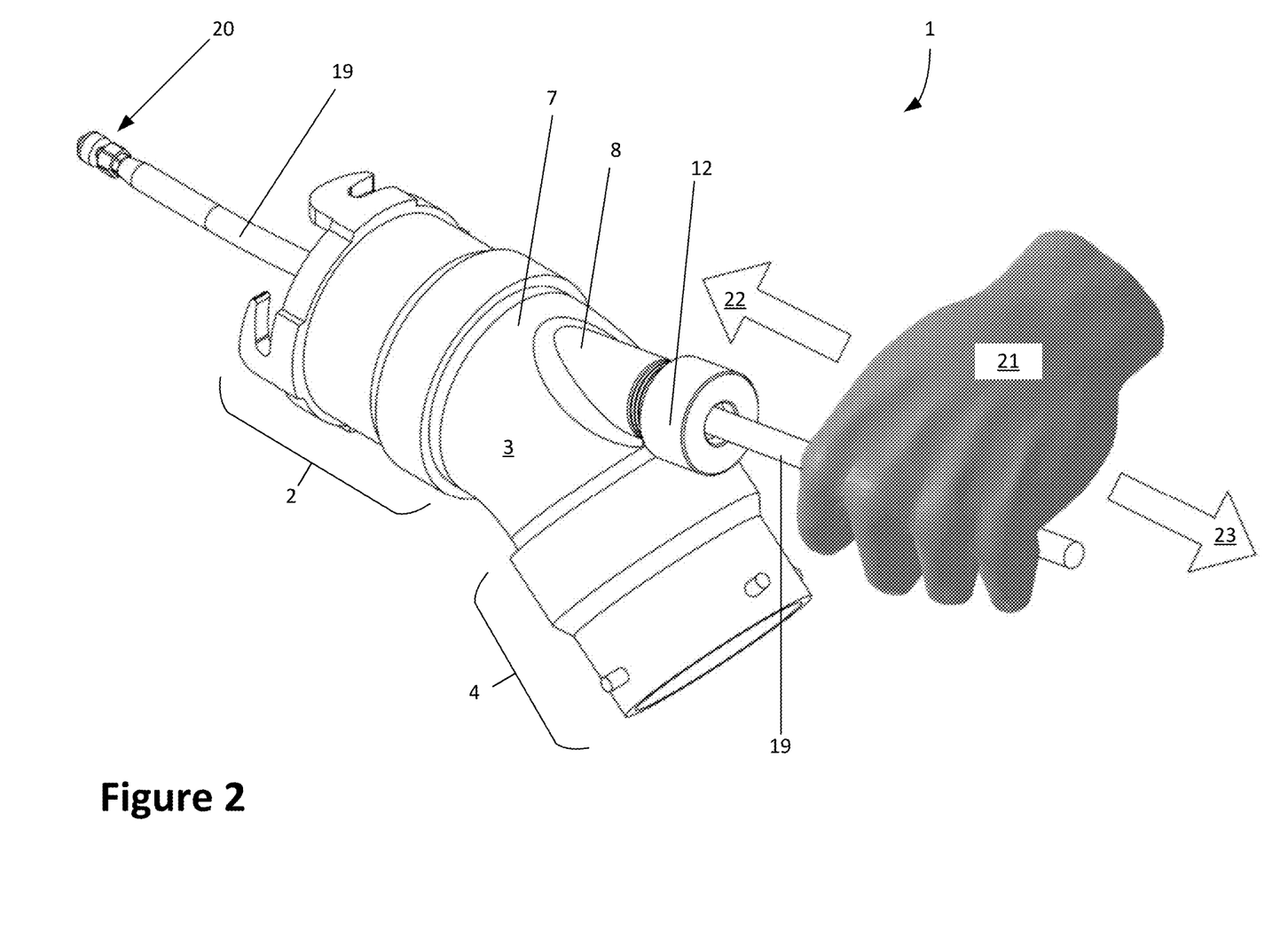
FIG. 2 is a front perspective view of the assembled black tank sewer flush kit and depicting a use of the kit in accordance with the present invention.
Figure 3:
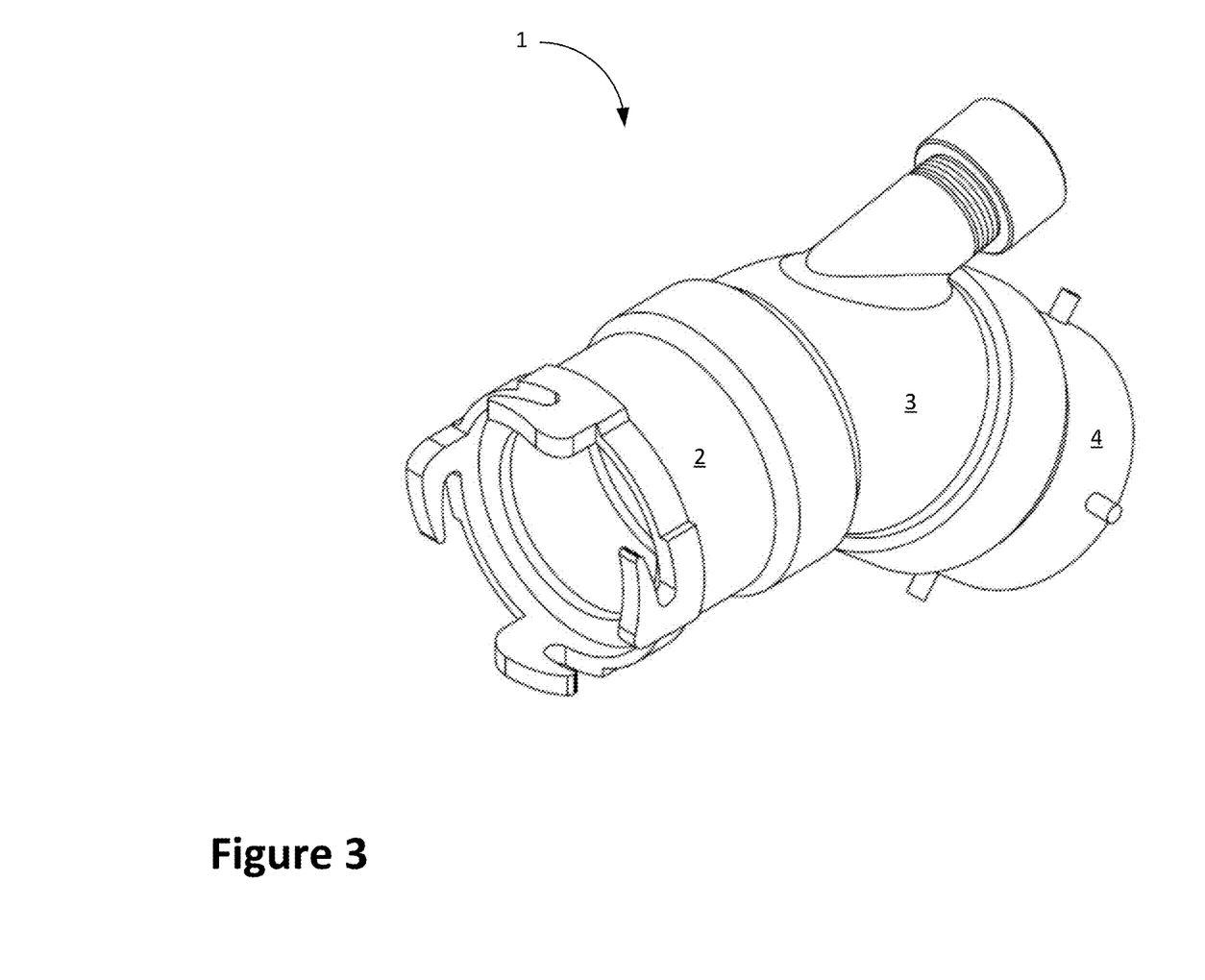
FIG. 3 is a rear perspective view of the assembled black tank sewer flush kit in accordance with the present invention.
Figure 4:
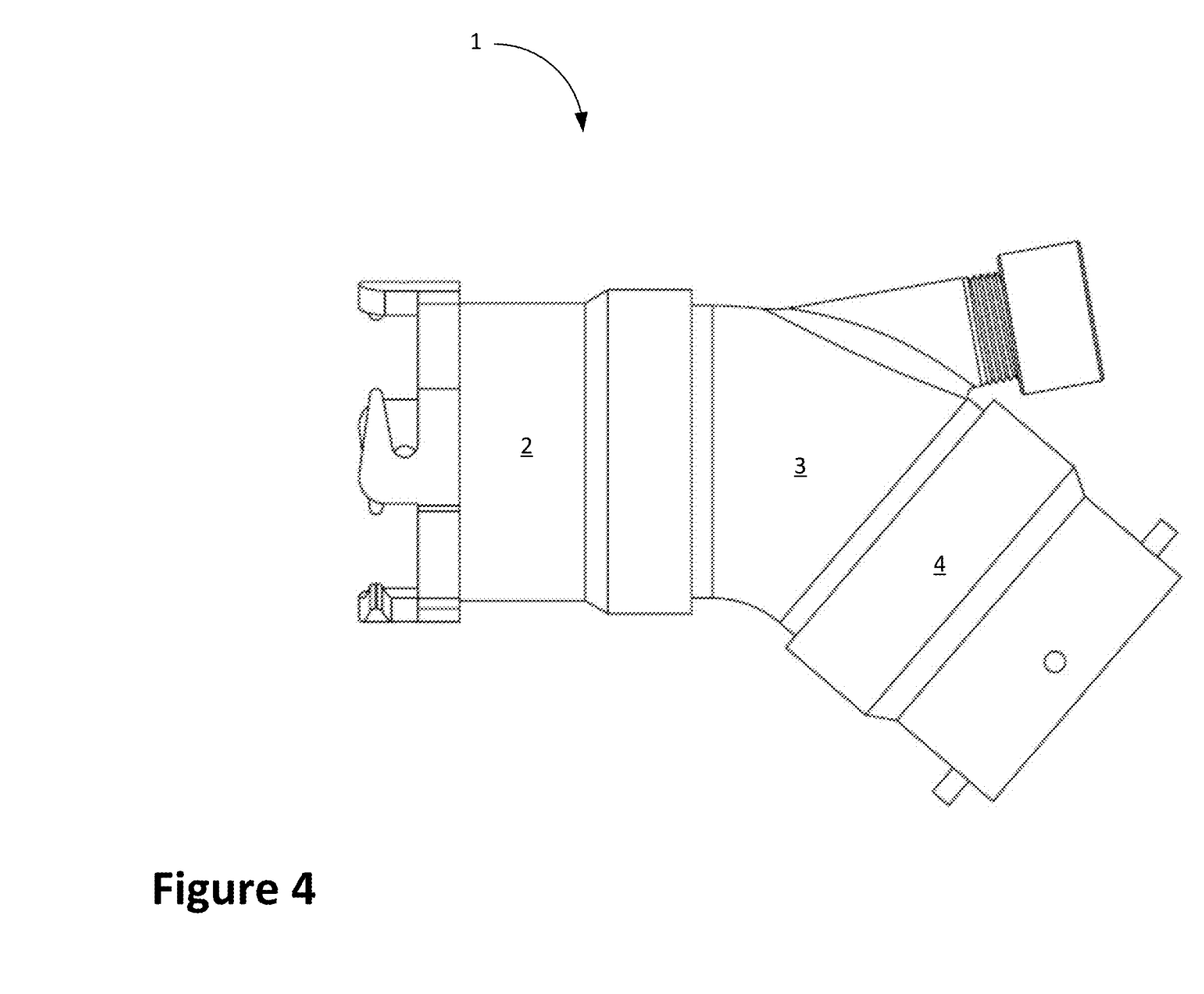
FIG. 4 is a side view of the assembled black tank sewer flush kit in accordance with the present invention.
Figure 5:
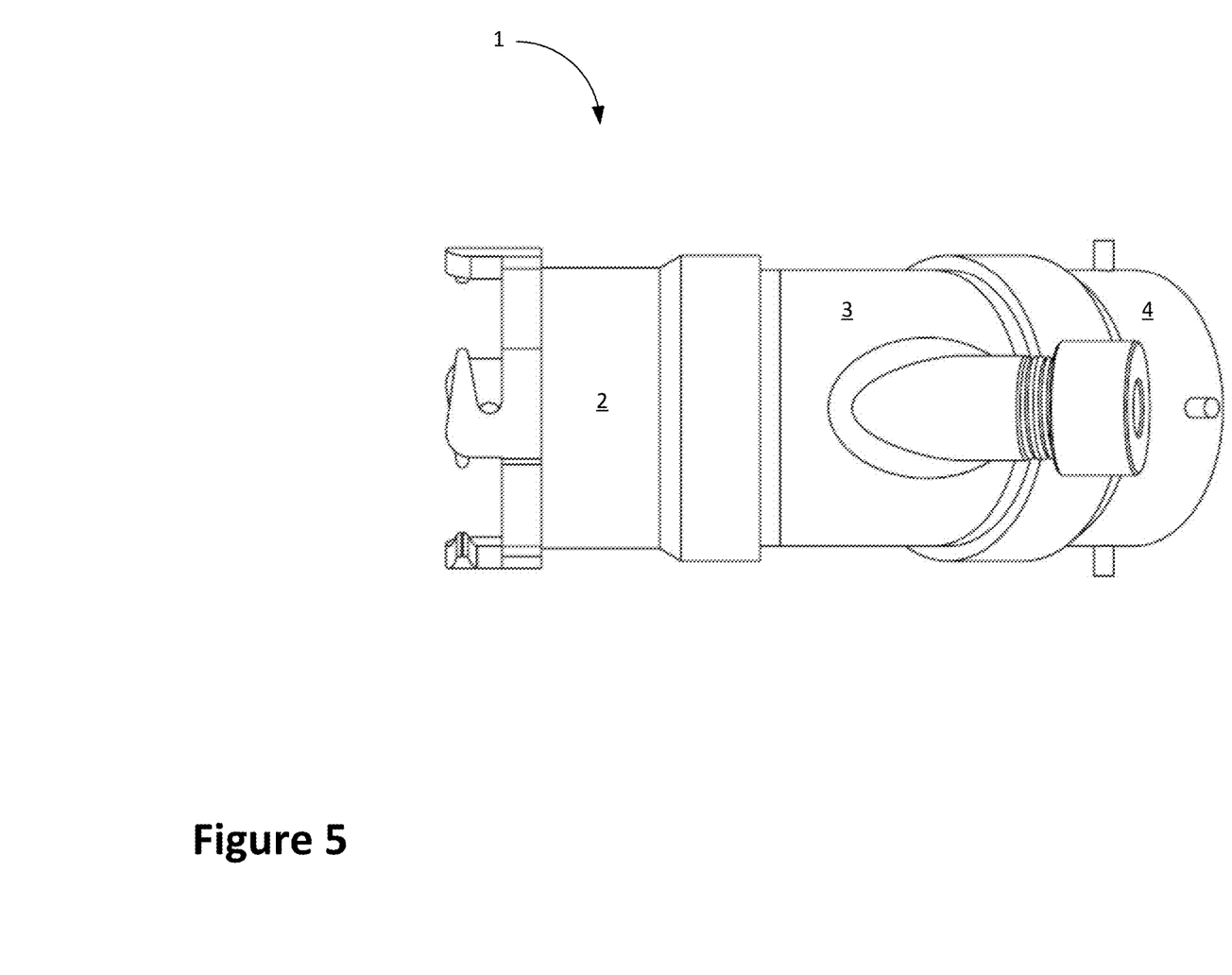
FIG. 5 is a top view of the assembled black tank sewer flush kit in accordance with the present invention.
Figure 6:
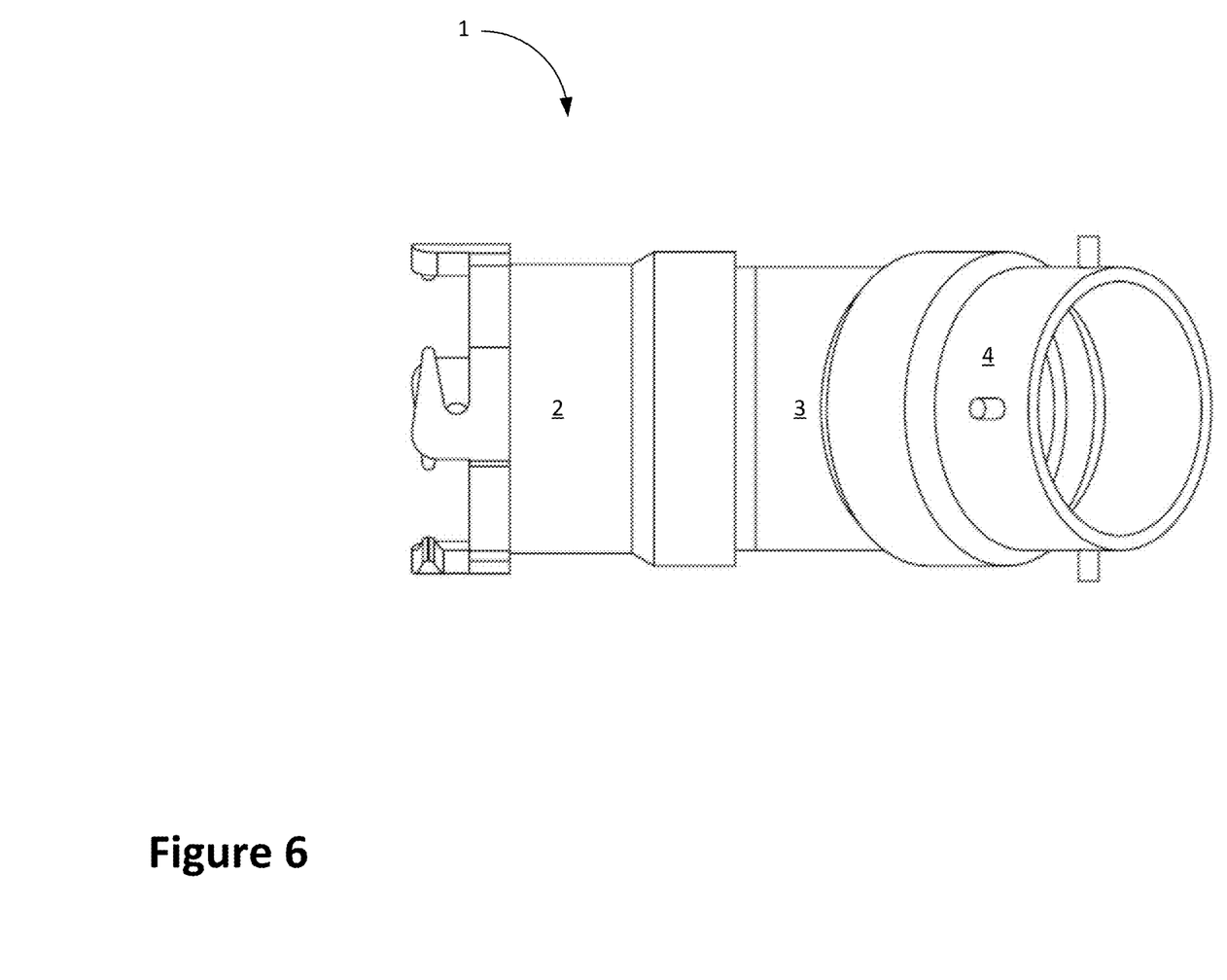
FIG. 6 is a bottom view of the assembled black tank sewer flush kit in accordance with the present invention.

As shown in FIG. 2, which shows kit 1 of FIG. 1 in an assembled configuration, when flusher adapter 3 is in use, a water hose 19 may pass through all of the opening 13 of fastener 12, the opening 11 of flexible sealing washer 10, opening 9 of boss connector 8, proximal end opening 5 of tubular body 7, passing the vehicle's waste valve through the piping connecting the waste valve to the black tank, and into the interior cavity of the black tank. When water hose 19 is in this position, water pressure can be applied directly from nozzle 20 of water hose 19 to the interior walls of the black tank to achieve a direct washing effect and help loosen and dislodge any sewer sludge or other sewage that has adhered to the interior tank walls.

Further, an operator can grip water hose with a hand 21 near the distal end of boss connector 8 and apply a push 22 or pull 23 force to water hose 19 to move nozzle 20 to different locations within the black tank. This allows for greater area of the tank interior to which direct water pressure is applied thereby increasing the potential for dislodging or loosening adhered sewage from the tank walls.

When kit 1 is assembled and installed on a vehicle's waste valve, push force 22 by hand 21 can be applied to a portion of water hose 19 extending from the distal end of boss connector 8 to snake water nozzle 20 and hose 19 through the piping connecting the vehicle's waste valve and the black tank and into the black tank interior. During flushing, both push 22 and pull 23 forces may be applied by hand 21 to a portion of water hose 19 extending from the distal end of boss connector 8 to position nozzle 20 and hose 19 within the vehicle's black tank. When flushing is complete, pull force 23 by hand 21 can be applied to retract nozzle 20 and hose 19 from the black tank and out the waste valve of the vehicle. For this, the diameter of flexible sealing washer 10 opening 11 should be large enough to allow the water hose to longitudinally traverse opening 11 of sealing washer 10 when push 22 or pull 23 forces are applied by hand 21 to water hose 19. At the same time, the diameter of flexible sealing washer 10 opening 11 should be small enough to fit snugly around water hose 19 to form at least a leak resistant seal. Kit 1 may be provisioned with several washers with different opening diameters to accommodate different nominal water hose sizes. In general, however, the diameter of flexible sealing washer 10 opening 11 may be smaller than both the diameter of distal end opening 9 of boss connector 8 and opening 13 of fastener 12.

Flexible sealing washer 10 may be formed as flexible material to allow water hose 19 to more easily longitudinally traverse washer 10 opening 11 when a force 22 or 23 is applied by hand 21 to hose 19. In some embodiments, flexible sealing washer 10 is composed substantially entirely of flexible gum rubber. Beneficially, the gum rubber has a wiper effect on the outside of water hose 19 when pull force 23 is applied by hand 21 that tends to keep sewage that has splashed onto the water hose on the proximal side of washer 10 and within the interior of boss connector 8 and away from the operator's hand on the distal side of washer 10. While gum rubber may be used, other materials as an alternative to or in composition with gum rubber may be used such as, for example, HNBR (rubber), silicone, felt, or nylon.

When flush adapter 3 is in use, fastener 12 is used to secure flexible sealing washer 10 in place at the distal end of boss connector 8 to form a leak resistant seal. After the operator has inserted the water hose through fastener 12, flexible sealing washer 10, and boss connector 8, the operator may secure flexible sealing washer 10 between the distal end of boss connector 8 and fastener 12 by forming the attachment between fastener 12 and the distal end of boss connector 8.

In some embodiments, fastener 12 is a nut that has internal threads 16 for forming a threaded attachment with external threads 14 of boss connector 8. While in some embodiments fastener 12 is a threaded nut for forming a threaded connection with a threaded distal end of boss connector 8, other types of fasteners suitable for forming a watertight connection while securing flexible sealing washer 10 at distal end of boss connector 8 may be used such as, for example, screw-based or clamp-based fasteners.

When flush adapter 3 is in use, distal adapter 4 may be connected to a sewer hose which is connected to a sewer drain. Alternatively, distal adapter 4 may be connected to the Sewer Extender which in turn is connected to a sewer hose which in turn is connected to a sewer drain. As yet another alternative, the distal end of flush adapter 3 may be connected directly to the telescoping body of the Sewer Extender without use of distal adapter 4. In any case, as the black tank is flushed of sewage by water pressure emitted from water hose nozzle 20 that is located within the black tank interior, the sewage and water conveniently drain to the external sewer drain while keeping the ground and the operator generally clean of sewage and water. Thus, flush adapter 3 can be used is accomplish a sanitary flush of the vehicle's black tank.

In some embodiments, the distal end of boss connector 8 has a slightly flattened tapered end at the distal end of boss connector 8 that forms opening 9 of boss connector 8. In other words, the interior diameter of the tapered end is the diameter of opening 9. When fastener 12 is attached to the distal end of boss connector 8, the tapered end holds flexible sealing washer 10 in place in a non-threaded channel at the interior base of fastener 12 between internal threads 16 and opening 13. The width of the non-threaded channel may be approximately the same width or a slightly larger width as flexible sealing washer 10 such that washer 10 seats snuggly in the channel when fastener 12 is securely attached to the distal end of boss connector 8 and held in place by the tapered end of boss connector 8 to form a leak resistant seal.

The diameter of the flexible sealing washer 10 opening 11 may be smaller than both the diameter of boss connector 8 opening 9 and the interior diameter of the tapered end of boss connector 8 so that that the portion of flexible sealing washer 10 surrounding hose 19 can flex toward and away from fastener 12 opening 13 as push 22 and pull 23 forces are applied by hand 21 to hose 19. While flexing in this manner, flexible sealing washer 10 remains in contact with the outer surface of hose 19 to prevent sewage from leaking out through opening 11 of washer 10 and to prevent sewage that splashes on the hose 19 from being carried out on the surface of the hose 19 when pull force 23 is applied by hand 21 to hose 19 to retract hose 19 from opening 11 of washer 10 and out through opening 13 of fastener 12.

The diameter of flexible sealing washer 10 may be approximately the same as the diameter of the channel at the interior base of fastener 12 where the diameter of the channel is larger than the diameter of opening 13 of fastener 12 such that the tapered end of the boss connector 8 holds flexible sealing washer 10 in place in the channel when fastener 12 attached to the distal end of boss connector 8 with enough force that push 22 and pull 23 forces applied by hand 21 to hose 19 do not unseat washer 10 from the channel and into the interior of boss connector 8 or out through opening 13 of fastener 12.

While kit 1 including flush adapter 3 may be used with recreational vehicles, motorhomes, fifth wheels, trailers, and other like vehicles, kit 1 including flush adapter 3 may be used with boats or other water floating vessels that have like lavatories or water closets and black tanks such as, for example, recreational houseboats.

What is claimed is:

1. A black tank sewer flush adapter comprising:
   a tubular body having a proximal end opening and a distal end opening;
   a boss connector connected to or integrally formed to the tubular body, the boss connector comprising an externally threaded distal end opening through which a flexible high pressure hose can pass longitudinally and extend from both the distal end opening of the boss connector and the proximal end opening of the tubular body, wherein the externally threaded distal end opening of the boss connector is different than the distal end opening of the tubular body;
   a flexible sealing washer comprising an opening through which the flexible high pressure hose can pass longitudinally, wherein the flexible sealing washer remains in contact with an outer surface of the flexible high pressure hose while the flexible sealing washer is surrounding the flexible high pressure hose; and
   a threaded nut, with internal threads, comprising an opening, that is larger than the opening of the flexible sealing washer, through which the flexible high pressure hose can pass longitudinally and for forming an attachment with the externally threaded distal end of the boss connector while the flexible high pressure hose passes longitudinally through at least all of the opening of the threaded nut, the opening of the flexible sealing washer, and the externally threaded distal end opening of the boss connector,
   wherein the flexible sealing washer, when the attachment is formed, is between the externally threaded distal end of the boss connector and an interior base of the threaded nut,
   wherein the flexible sealing washer, when the attachment is formed, forms a leak resistant seal around the flexible high pressure hose,
   wherein a portion of the flexible sealing washer surrounding the flexible high pressure hose flexes:
      toward the threaded nut as pull forces are applied to the flexible high pressure hose to longitudinally traverse the opening of the flexible sealing washer; and
      away from the threaded nut as push forces are applied to the flexible high pressure hose to longitudinally traverse the opening of the flexible sealing washer.

2. The black tank sewer flush adapter of claim 1, wherein the opening of the threaded nut comprises a diameter of at least one-half inch.

3. The black tank sewer flush adapter of claim 1, wherein a diameter of the opening of the flexible sealing washer is smaller than both a diameter of the opening of the threaded nut and a diameter of the distal end opening of the boss connector.

4. The black tank sewer flush adapter of claim 1, wherein the distal end opening of the boss connector comprises a diameter of at least one-half inch.

5. The black tank sewer flush adapter of claim 1, wherein the flexible high pressure hose has a diameter of one-quarter of an inch, three-eighths of an inch, one-half of an inch, five-eighths of an inch, or three-quarters of an inch.

6. The black tank sewer flush adapter of claim 1, wherein the tubular body comprises an elbow angle between zero and ninety degrees.

7. The black tank sewer flush adapter of claim 1, wherein the tubular body is straight.

8. The black tank sewer flush adapter of claim 1, wherein the flexible sealing washer comprises gum rubber.

9. The black tank sewer flush adapter of claim 1, wherein the tubular body comprises a transparent portion that allows for visual observation of waste material draining from a black tank through the tubular body.

10. The black tank sewer flush adapter of claim 1, wherein the boss connector comprises an internally threaded distal end for forming a threaded attachment with a water hose connector.

11. The black tank sewer flush adapter of claim 1, wherein the distal end of the black tank sewer flush adapter is connected to a bayonet flange adapter with lug fittings and the proximal end of the black tank sewer flush adapter is connected to an adapter with sewer hose adapter fittings.

12. The black tank sewer flush adapter of claim 1, wherein the distal end of the black tank sewer flush adapter is connected to a telescoping body of a sewer extender and the proximal end of the black tank sewer flush adapter is connected to an adapter with sewer hose adapter fittings.

13. The black tank sewer flush adapter of claim 1, wherein:
   the threaded nut comprises a non-threaded channel for the flexible sealing washer at an interior base of the threaded nut; and
   the flexible sealing washer is held in the non-threaded channel by the distal end of the boss connector when the attachment is formed.

14. A black tank sewer flush kit comprising a proximal adapter, a distal adapter, and the black tank sewer flush adapter of claim 1.

15. A black tank sewer flush kit comprising:
   a first adapter with sewer hose adapter fittings;
   a second adapter with lug fittings; and
   the black tank sewer flush adapter of claim 1 connected to both the first adapter and the second adapter.

* * * * *